United States Patent [19]
Lamm

[11] 3,767,557
[45] Oct. 23, 1973

[54] CHLORINATOR INCLUDING MEANS TO FEED AN ELECTROLYTE OF PREDETERMINED DENSITY AND MEANS TO WITHDRAW CHLORINE AGAINST A VARYING BACK PRESSURE

[76] Inventor: August Lamm, 365 Moseley Rd., Hillsborough, Calif. 94010

[22] Filed: July 1, 1971

[21] Appl. No.: 158,859

Related U.S. Application Data

[63] Continuation-in-part of Ser. No. 725,282, April 30, 1968, abandoned.

[52] U.S. Cl.................. 204/263, 204/151, 204/266
[51] Int. Cl............................................... B01k 3/10
[58] Field of Search.................... 204/151, 263, 266, 204/275, 278, 229

[56] References Cited
UNITED STATES PATENTS

| | | | |
|---|---|---|---|
| 3,274,094 | 9/1966 | Klein | 204/278 |
| 1,982,224 | 11/1934 | Michel | 204/266 |
| 1,259,683 | 3/1918 | Van Hasselt | 204/266 |
| 1,373,394 | 4/1921 | Allen | 204/266 |
| 3,223,242 | 12/1965 | Murray | 204/266 |

Primary Examiner—John H. Mack
Assistant Examiner—W. I. Solomon
Attorney—Hohbach, Test, Albritton & Herbert

[57] ABSTRACT

An diaphragm electrolytic cell for decomposing brine into free chlorine gas for distribution in a water pool against varying gas pressure. The cell has a brine inlet column, a liquid product discharge column, and a chlorine withdrawal column extending above the cell, with the brine inlet column vented to the atmosphere and connected to the anode chamber and with the liquid product discharge column vented to the atmosphere, connected to the cathode chamber, and having a liquid column pressure larger than the maximum back pressure at the point of distribution of the chlorine from the chlorine withdrawal column. A reservoir contains solid salt which is allowed to dissolve in water. The invention also includes means for automatically metering a small quantity of brine through the cell at a suitable brine concentration.

22 Claims, 9 Drawing Figures

INVENTOR.
August Uno Lamm

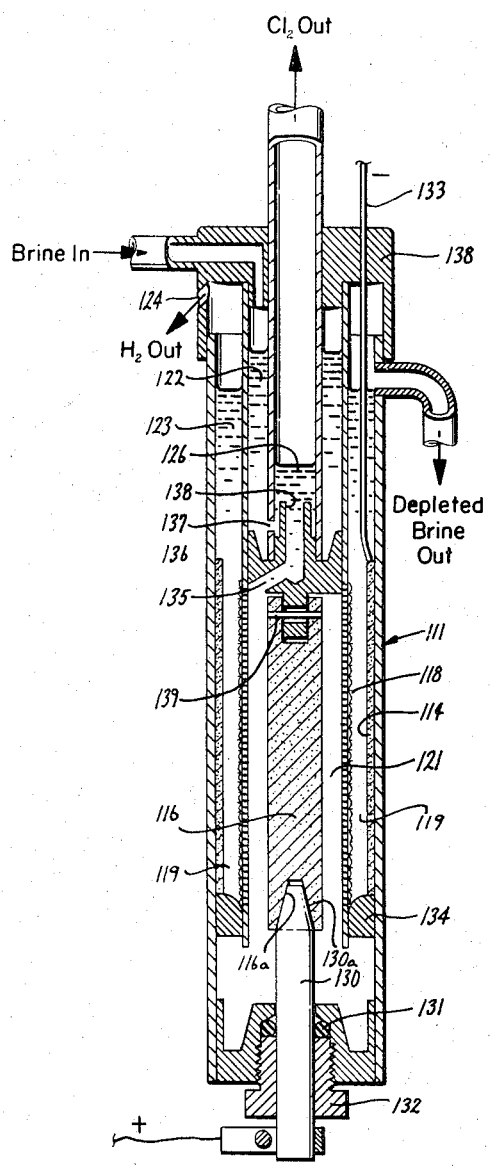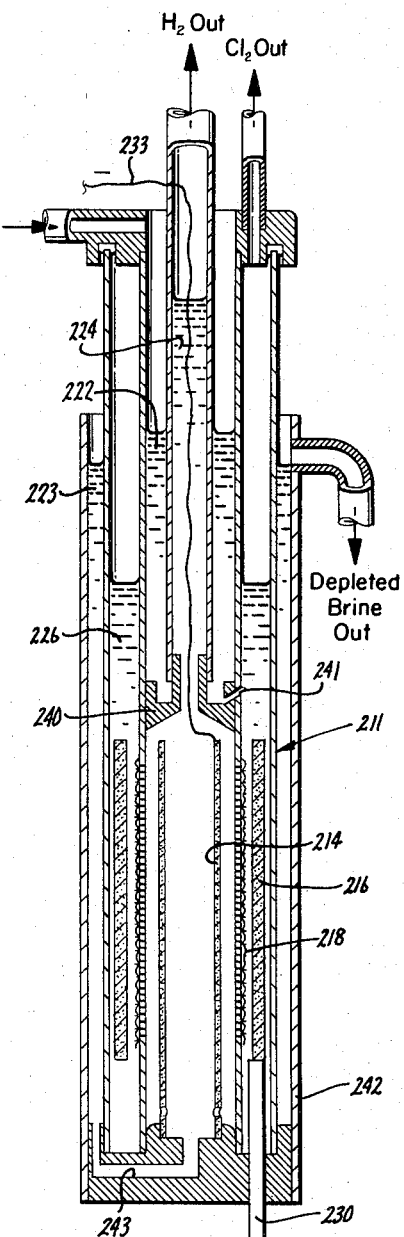
Fig. 4
Fig. 5

CHLORINATOR INCLUDING MEANS TO FEED AN ELECTROLYTE OF PREDETERMINED DENSITY AND MEANS TO WITHDRAW CHLORINE AGAINST A VARYING BACK PRESSURE

CROSS REFERENCE TO RELATED APPLICATIONS

This is a Continuation-In-Part of my earlier application Ser. No. 725,282 filed Apr. 30, 1968 and entitled CHLORINATOR and now abandoned.

BACKGROUND OF THE INVENTION

This invention relates to chlorinators and more particularly to chlorinator equipment for automatically supplying small quantities of chlorine gas for disinfecting volumes of water such as in swimming pools.

It is common practice to add chlorine to swimming pools and water supplies by direct application of chlorine gas or by the frequent addition of chemicals which release free chlorine on contact with water. The use of chlorine gas directly is usually limited to municipal works due to the difficulty of safely handling the material. Chlorine supplying chemicals are relatively expensive and are usually added in batches at the discretion of the owner. However added, an appropriate chlorine concentration should be maintained and this requires the making of frequent checks and additions of chlorinating materials as part of pool maintenance. There is, therefore, a need for a new and improved chlorinator.

SUMMARY OF THE INVENTION AND OBJECTS

In general, it is an object of the present invention to provide an automatic water pool chlorinator which will overcome the above mentioned limitations and disadvantages by using an electrolytic cell which supplies appropriate amounts of free chlorine gas to the water pool without requiring frequent attention.

Another object of the invention is to provide an automatic chorinator of the above character which requires for its operation only electricity, water, and solid salt, the latter being supplied infrequently.

Another object of the invention is to provide an automatic chlorinator of the above character which is particularly adapted for use in chlorinating swimming pools and which will continuously supply very small quantities of chlorine gas under varying pressure so as to maintain dissolved chlorine content of pool water at a desired concentration.

Another object of the invention is to provide an automatic system for the production of small quantities of chlorine utilizing the combination of an electrolytic cell in which a chloride is decomposed and a system for metering small, controlled amounts of brine to the cell.

In general, the above objects are achieved with a chlorinator having a chlorine gas outlet submerged in the pool water or to a pool input water line or other suitable location. The chlorinator includes an electrolytic cell for decomposing brine into chlorine gas and other products, the cell having liquid columns thereabove and communicating with it for feeding of brine and for discharging produced chlorine gas and depleted brine. The chlorinator also includes a power supply for supplying direct current electricity to the cell, and a source of brine. The source of brine consists of a reservoir (mixing vessel) for solid salt and means for maintaining a water bath in contact with the salt to form an aqueous salt solution of variable density. Water is thus supplied to the mixing vessel through means for limiting the rate of supply, these means preferably responsive to a liquid level. Means for conveying salt solution of preselected density from the mixing vessel and to the input column of the cell are provided. The chlorinator also includes a metering device for causing measured small quantities of unsaturated brine of predetermined density to be delivered to the cell. The metering device can take various forms limiting either the flow of input water to the mixing vessel, the flow of brine from that vessel to the cell or the flow of the depleted brine from the cell. Particular metering constructions, specific gravity sensitive means, and electrolytic cell constructions which are especially adapted to use with swimming pools are also disclosed.

These and other objects and features of the invention will become apparent from the following description and claims when taken in conjunction with the accompanying drawings.

BRIEF DESCRIPTION OF THE FIGURES

FIG. 4 is a cross sectional view of a modified form of electrolytic cell constructed in accordance with the invention.

FIG. 5 is a cross sectional view of another modified form of electrolytic cell constructed in accordance with the invention.

DESCRIPTION OF THE PREFERRED EMBODIMENTS

Figure 1:
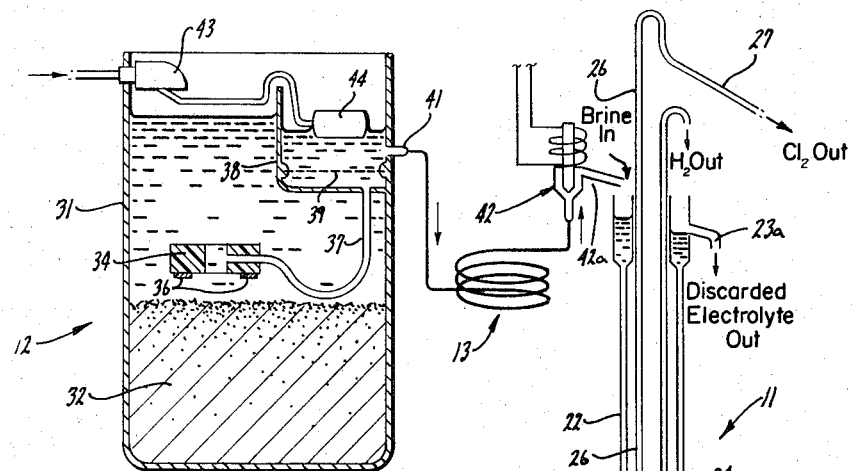
FIG. 1 is a schematic diagram illustrating the chlorinator constructed according to the present invention.

Referring to FIG. 1, there is shown a general arrangement of a chlorinator 10 constructed in accordance with the invention and consisting of an electrolytic cell 11, a source of brine 12 and a full flow metering device 13. Cell 11 is supplied with fresh brine which is decomposed due to the electrolytic action supported by current flowing between a negative electrode or cathode 14 and a positive electrode or anode 16 which are connected to a suitable dc power source 17.

Electrolytic cell 11 can be of any suitable type but is preferably a diaphragm type cell. In such a cell, cathode and anode electrodes 14 and 16 are separated by a semi-permeable partition or diaphragm 18 dividing the cell into two chambers, a cathode chamber 19 and an anode chamber 21. Fresh brine is supplied to chamber 21 containing the anode 16 through column 22 vented to the atmosphere and having a height greater than the largest distance between electrolytically active parts of said anode and cathode and depleted electrolyte discarded from the other chamber 19 containing cathode 14 through a column 23. The equation of reaction is $$2NaCl + 2H_2O \xrightarrow{emf} 2NaOH + H_2\uparrow + Cl_2\uparrow.$$

The depleted electrolyte is heavier than brine and therefore the inlet to column 23 is located near the bottom of chamber 19. The hydrogen gas formed in the reaction is permitted to escape by bubbling through discharge line or column 24 to chamber 19.

The chlorine gas output which is formed at anode 16 is permitted to rise from chamber 21 through a discharge line or column 26 disposed directly above the anode. Column 26 is connected to piping 27 in communication with the water being treated.

Electrolytic cell 11 and the columns can be constructed of any suitable material resistant to corrosion or decomposition by the chemicals present. For example, the common plastic polyvinyl chloride (PVC) is quite suitable. The anode 16 can be made of graphite or platinized titanium and the cathode 14 can be made of graphite, titanium, or stainless steel. Commonly, the diaphragm is made of porous plastic material such as polyvinyl chloride and polyethlene asbestos matting or fiber glass fabric. Particular constructions for improved electrolytic cells for the purpose of the present invention are shown and described hereinafter in connection with FIGS. 4 and 5.

The chlorine discharge line 27 can be led to one of several appropriate locations in the water pool system. For example, it may be located at an appropriate depth under the surface of the pool water in the vicinity of the water inlet to the pool so that chlorine gas is carried away rapidly and efficiently mixed with incoming water. The chlorine gas must then be provided at an overpressure which varies with the water level of the pool and with the water currents in the vicinity of the gas outlet but at times there may be an underpressure. In either event, the varying of the pressure will be taken care of by variations of the liquid level in column 26 while the total pressure in the electrolytic cell is kept roughly constant as determined by the level of the outlet 23a for depleted electrolyte at the top of the column 23. The gas outlet could also terminate at some suitable point of the pool water circulating system or into a special bypass line through which part of the circulating water may be diverted and thence returned to the pool. In any event, such separate means in which the chlorine is mixed with water should be made of PVC plastic or other corrosion resistant material.

The source 12 for automatically supplying brine at a predetermined concentration consists of a reservoir 31 for receiving solid salt crystals 32 and for maintaining a water bath 33 in contact with said salt crystals to form an aqueous salt solution. The concentration of the aqueous salt solution varies with height above the salt crystals so that a density gradient is established in the solution.

Means may be disposed in the salt solution, responsive to its density for supplying salt solution of a predetermined specific gravity or density to the electrolytic cell. As one form, such means consists of a submerged float 34 having a displacement to weight ratio corresponding to the predetermined value of desired density of brine so that the float maintains itself at the corresponding level in the brine solution. Suitable densities permit the use of a plastic float, made, for example, of polyethylene which may be adjusted by attaching of metal weights on its lower side. The weight also serves to stabilize the motion of the float so that it remains upright. Polyethylene is a preferred material since it also has a low absorption of water which helps maintain its density at a constant value. Thus, the float takes its position at a level where the concentration is correct independently of the circumstances of varying solid salt level, water level, temperature etc. In this way, the correct concentration of brine at a preselected value is automatically provided.

Float 34 carries a flexible tube 37 opening through the float or guided by it and connected to a separate brine reservoir or well 38. In the reservoir 38, brine from the flexible tube passes in series through a filter membrane 39 disposed in its path and continues to an outlet 41, metering device 13, and a shutoff valve 42 to the input column 22 of the electrolytic cell 11.

It is desirable to feed the electrolytic cell with a salt solution which is not saturated so as to avoid deposits and clogging of diaphragm 18. Furthermore, high concentration of salt causes a higher decomposition of anode material. On the other hand, if the solution is too dilute, the electrical resistance and power loss is increased to undesirable level. Accordingly, suitable concentration has been found which lies between approximately 10 to 24 grams sodium chloride per 100 grams of final solution.

It is found that the salt solution of the above concentration, when dispensed at the order of about 1 drop in one to seven seconds, is adequate to supply the quantity of chlorine required for an ordinary swimming pool. Experiments have indicated this quantity of liquid to be so small that a needle valve, or other conventional metering means, tends to clog up and is unable to provide a constant flow at such a small rate. Even if the needle valve is made to shut periodically, the clogging tendency still remains. To avoid this, there is provided dosage or metering means having an unconstricted or full-flow cross section for permitting low flow rates without clogging. Such means preferably consists of a long tube having a sufficiently small inside diameter to limit the flow of liquid by internal friction (viscosity) and by the interaction between the flowing liquid and the tube wall (fluid friction). With reference to full-flow cross section, the rate of flow through the tube is a function of the inside diameter and length of the tube and of the pressure difference over the tube. Therefore, the inside diameter or cross section is set above a value at which clogging cannot occur, above about 1/16 inch, and the length of the tube and the liquid pressure are adjusted accordingly. In practice, a tube about 2 to 6 feet in length with an inside diameter of about 0.08 of an inch has been found satisfactory.

The shut-off valve 42 can be electrically operated to open and shut with the switching on and off of current through the electrolyzer. This, in turn, can be combined with the starting and stopping of the circulating pump for the pool water filtering equipment. Other switching arrangements can also be used.

A float valve 43 is used to control fresh water flow into reservoir 31 and has the advantage of taking care of the high pressure of the water main. This simplifies the dosage of liquid to the electrolyzer which is varied by adjusting the difference of overflow point 42a and the liquid level in vessel 38 which represents only a pressure of the order of one or a few inches of water column.

The float 44 of the valve 43 is located in well 38 although the water enters the main reservoir 31. It could be located in reservoir 31 with some sacrifices in accuracy. Because of the difference in average concentration and specific gravities of the liquids in the reservoir 31 and in region 38, these levels do not coincide.

In operation, a batch of rock salt is disposed in reservoir 31 and fresh or recirculated water is admitted by valve 43 until well 38 is filled and float 44 shuts off the valve. The submerged float 34 automatically seeks a proper level so as to supply brine at the predetermined concentration. Brine flows out through tubing 13 under a low head, the flow being limited by fluid friction so that small quantities of brine are supplied to the brine input column 22 of the electrolytic cell 11. Chlorine and other products formed in the cell are dispensed as previously indicated. It has been found that the reservoir need only be charged with a replenishment of rock salt only every few months depending upon its capacity, which can be of the order of 20 to 100 pounds.

Figure 2:
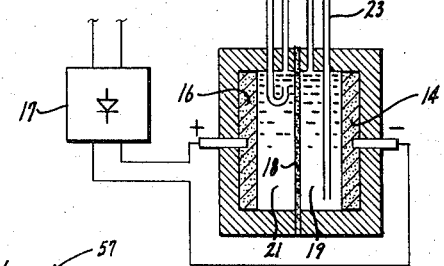
FIG. 2 is a schematic diagram illustrating a modified form of metering arrangement for a chlorinator constructed in accordance with the invention.
Figure 2:
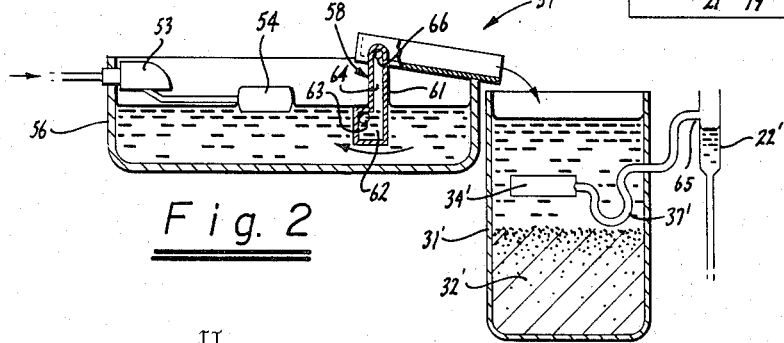

FIG. 2 shows a modification of the system in which a valve 53 operated by a linear mounted float 54 is located in a separate entrance vessel 56 connected to the water supply and a dosage or metering device 57 controls the flow of water from this vessel to the reservoir 31'. Brine of the predetermined concentration is extracted at the submerged float 34' and through tube 37' to brine input column 22' of the electrolyzer which it is not necessary to illustrate and can be, as indicated elsewhere herein. This arrangement has an advantage in that the float valve and the dosage device only have to handle clean water.

Figure 3:
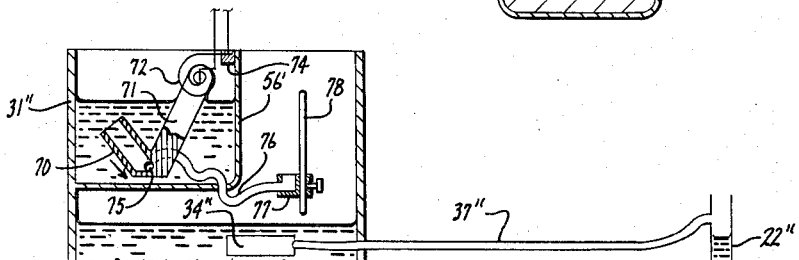
FIG. 3 is a schematic diagram illustrating a modified form of shut-off of the flow of brine to the electrolytic cell in combination with other features.

The dosage device could consist of a long narrow tube like 13 in FIG. 1 extending from vessel 56 to an adjustable lower output point, and discharging into the mixing vessel as shown in FIG. 3 and described later. An alternative arrangement is shown in FIG. 2, consisting of a rotating scoop 58 which meters the fresh water input to reservoir 31', as shown in FIG. 2. Scoop 58 lifts defined quantities of liquid out of the vessel with roughly constant liquid level and conveys it to a recipient flute 59 leading to the reservoir and includes a rotating arm 61 having a hollow portion 62 at its end which becomes filled with liquid through the hole 63 when the arm is in a lower position. When the arm is turned up 90° in the sense shown by the arrow, the measured volume of liquid pours out through channel 64, through a center hold 66 and onto flute 59. The scoop is steadily rotated at a suitable speed by suitable means, as an electric motor (not shown). The rotating movement could either be a steady rotation by a slow-speed motor or an oscillatory one. The oscillatory movement could be achieved by an electrically heated bi-metal of well-known type, e.g., a spirally wound bi-metal strip, connected to the shaft of the scoop. The shaft also actuates a switch, which closes and opens the electric heating circuit at the two end positions of the oscillating movement, so that this movement is perpetually repeated as long as electric supply is maintained. Alternatively, a scoop could be designed to move up and down in a linear sense. It could then empty through a flexible tube when raised to sufficient height.

As water is added to the mixing vessel at a rate controlled by the scoop roughly the same rate of ready brine will enter column 22' of the electrolytic cell over the spillway 65. The operation of the remainder of the chlorinator of FIG. 2 is as described in connection with FIG. 1.

Naturally the scooping device just described could also be used in connection with the general arrangement shown in FIG. 1, substituting the long narrow tube 13 and taking liquid from vessel 38 to the electrolytic cell. Either form of dosage or metering method can thus be used either for direct metering of the quantity of ready brine supplied to the electrolytic cell or, indirectly, for controlling the supply of water to the mixing vessel which, in turn, discharges into the cell. Common to both methods is the controlled liquid level at the input side of the metering device. However, even where there is a separate entrance vessel such as 56 in FIG. 2, the metering device could be connected between the mixing vessel and the electrolytic cell. The entrance vessel would then discharge water directly into the mixing vessel through a passage, so restricted only, the salt water could not penetrate back into the entrance vessel. The liquid levels in the two vessels would keep balancing out in accordance with the different specific gravities.

In the case of FIG. 2, where a separate entrance vessel for the water is used, the water level could also be kept constant by other means than a float valve. Thus, water could be supplied to this vessel in abundance, the excess of water being withdrawn over a spillway, located at the desired water level. In the case where water is provided from the pool which is to be chlorinated, the water feeding line could be connected to the pressure side of the circulating pool water pump, so that a part of the circulating water is diverted to the entrance vessel. The excess of water from the spillway is returned to the pool, e.g., through a separate line. Such separate return line could at the same time be used to carry the produced chlorine to the pool. An advantage is that the supply of water will start and cease with starting and stopping of the circulating pump.

Where, on the other hand, water is supplied from the mains and stationary means, like the long narrow tube 13 of FIG. 1, are used for metering purposes, separate means are required for shut-off of the supply of brine to the electrolytic cell. Instead of a valve 42 as in FIG. 1, the shut-off could be realized by inserting somewhere in the path from the water intake to the electrolyte output a tube, the input or output end of which is lifted above the constant water level to interrupt the flow.

FIG. 3 illustrates some of the embodiments mentioned. As in FIG. 2 an entrance vessel 56' is provided for the fresh water supply, the means for achieving the supply of water at constant level not being shown in FIG. 3. A tube 70 is carried by an arm 71 which rotates on a shaft 72. A plane spiral 73, made of a bi-metal strip is connected at one end to the shaft and at the other end to the fixed support 74. At the bottom of tube 70 is a port 75, connected to the flexible tube 76. This tube could be the long narrow tube constituting the metering device described above. The other output end of the tube is connected to the cup 77. Water entering through tube 70, when its top opening is under the water level passes through the tube, enters the cup and flows over its rim into the mixing vessel 31'. The rate of flow is a function of the difference between the water level in vessel 56' and the level of the rim of cup 77. This difference can be varied at will by sliding the cup up or down along a rule 78.

The flow is interrupted when the arm 71 swings so as to lift the opening of tube 70 above the water level. The movement is actuated by the bi-metal strip, which in its turn is heated electrically from the same power source as in feeding the electrolytic cell, e.g., by the bi-metal strip being connected in series with the electrolytic cell supply. When thus heated, the spiral turns the arm in the direction shown by the arrow, while when electric current is shut off and the spiral cools off, the arm is turned in opposite direction, lifting the opening of tube 70 above the water surface.

Alternatively, the outlet end of 76, i.e., the cup 77, could be lifted by a similar bi-metal device above the water level in vessel 56' in order to shut off the flow of water. Naturally these shut-off devices, described in connection with FIG. 3, could be used in conjunction with the outlet from any vessel having a roughly constant liquid level, e.g., in vessel 38 of FIG. 1. The operation of the remainder of the chlorinator of FIG. 3 is the same as that described in connection with FIG. 2.

Other preferred forms for the electrolytic cell and the associated liquid columns are shown in FIGS. 4 and 5 wherein similar parts have been given similar numbers preceded by an additional digit. The vessel 111 is a long, relatively narrow tube (of length at least 4 times its diameter), having a lower portion containing the active parts of the electrolytic cell and an upper portion containing two or more liquid columns which serve to balance the varying back pressure created by the outgoing gas.

In the specific example shown in FIG. 4, a graphite rod 116 serves as the anode. Electrical current is supplied to the rod through the bolt 130 which is sealed through the bottom of the vessel by a gasket 131 which is compressed by the threaded sleeve 132. The bolt 130 is made of compressed graphite or titanium or other electrically conducting material resistant to the chemicals involved. The cathode 114, which is not exposed to so strong chemical action as the anode, can be a cylinder of stainless steel or titanium plate or mesh, the electrical connection being through a wire or rod 133 of similar material, which extends upwards through the liquid column. In the space between anode and cathode, there is provided a semi-permeable diaphragm 118 having a tubular shape and concentrically located with respect to the anode and cathode. The diaphragm could consist of a perforated PVC cylindrical shell which serves as support for a semi-permeable material (asbestos, porous PVC or fibreglass fabric, or others). The supporting PVC cylinder passes tightly through a flange 134 and is not perforated at this section. In this way the cathode chamber 119 is sealed from the anode chamber 121 in such a way that the cylinder can conveniently be pulled out of the vessel during disassembly.

In FIG. 4, the upper part of the assembly is provided with members 122 through 126 to identify the various liquid columns with reference to numbers 22 through 26 of FIG. 1. The difference in liquid level in column 126 and that of column 122 represents the overpressure of the chlorine gas in relation to the density of the liquids. The chlorine gas produced passes through holes 135 in the separating member 136 and bubbles up through the central column 126 proceeding from there to its destination. The brine, which is fed to the upper end of column 122, enters through holes 137 in the wall of column 126, while the nozzle 138 is forming a trap preventing the rinsing chlorine gas from entering column 122.

The hydrogen bubbles rise from the cathode chamber 119 up through the discarded electrolyte in column 123 and out passageway 124 while the discarded electrolyte itself escapes through an over-flow at the top of this column, keeping a constant liquid level there. The cover 138 serves to keep dirt from falling into the assembly and could also serve as an entrance for the brine as shown.

There are several advantages of this arrangement of the electrolytic cell. The active parts which are exposed to chemical activity and wear, namely the anode and the diaphragm, can easily be removed from the assembly for overhaul or replacement, without it being necessary to disassemble liquid or gastight joints. As shown, the outer vessel could be a straight cylinder so that also the cathode could easily be pulled out if required. Reassembly is equally easy.

In order to secure good contact between anode 116 and its electrical lead-in 130, a pin 139, which holds the anode in place in its upper end, has sufficient (an axial) play so that the anode always rests on the bolt 130 at their conical contact surfaces 130a, 116a.

In the free space under the collar 134, graphite particles from the gradually disintegrating anode, may accumulate without spoiling the electrical insulation. In a modification, the diaphragm and the cathode could be combined into one assembly. The cathode could be a wire mesh applied directly on top of the outer surface of the diaphragm material. Alternatively, it could consist of metallic wire or tape wound in spiral form onto the diaphragm. The wire or tape could be wound alternately in left-hand and in right-hand spirals, in several parallel tracks so that a cross-patterned lattice is formed.

In FIG. 5, numbers 211 through 226 designate the same functional parts as the corresponding numbers 11 through 26 and 111 through 126 of FIGS. 1 and 4. The essential difference in relation to FIG. 4, is that the anode 216 is now the exterior electrode and the cathode 214 the interior electrode. The anode 216 can thus consist of a graphite or titanium cylinder supported by and connected to a lead-in bolt 230. The cathode 214 can be a metallic tube or a plate bent into tubular form. As in FIG. 4, the cathode connector is a wire 233, rising through the communicating liquid column 224. If desired, cathode 214 can be mechanically combined with the semi-permeable diaphragm 218 in a known manner. The gas trap, which prevents chlorine from entering column 222, is indicated in the Figure as slanted holes 241 in the stopper 240.

Outside of vessel 211 there is provided another concentrical tube 242, which communicates through channels 243 with the cathode chamber. Instead of this outer concentric tube 242 a special outside tube of narrower dimension could be connected to the bottom of the vessel and extending upwards to the level where the overflow for discarded electrolyte can suitably be located. Naturally, this same latter arrangement can be applied in the case of FIG. 3, especially if it is desirable to extract the depleted electrolyte from the lower part of the vessel.

In the design of FIG. 5, it is necessary to provide a gasket 244 to seal the inner wall of column 226 to the vessel wall to prevent chlorine gas from escaping.

It will be observed that the counterpressure of the chlorine gas in relation to atmospheric pressure can be either positive or negative. For instance, when the chlorine gas line discharges under the surface of the water to be chlorinated, the overpressure will be positive. When, on the other hand, the electrolyzer is shut down for a longer period, the water might penetrate into the gas line because of its affinity to chlorine. It could rise to such a level that it forms a liquid column which produces a vacuum in the chlorine system. The tube containing the liquid column through which the chlorine bubbles should therefore be extended to such a height that this vacuum is balanced against the combined free surface areas of the other liquid columns. In order that the level should not vary too much in the latter column, it is preferred to have a smaller cross section of the chlorine column than in the others.

On the other hand it could also be an advantage to have the chlorine bubbles column wide in relation to the column through which electrolyte is discarded. Such a relationship would cause depleted electrolyte to flow backwards through the diaphragm when the electrolytic cell is shut down and the decreasing chlorine gas pressure causes liquid to flow into the first mentioned column. Such a periodic reverse flow through the diaphragm would cause graphite and other particles deposited on the anode side of the diaphragm to be removed.

Also, occasional reversal of the current through the cell during short periods could be useful to eliminate clogging of the diaphragm. This could be done during start or stop of the chlorinator with the use of a temporary reversing switch.

FIGS. 6 – 9 show alternative means for automatically metering a small quantity of brine through the cell at suitable brine concentration. The metering means comprise means for supplying water to a vessel containing the solid salt crystals at a predetermined rate whereby saturated brine flows from the vessel at a corresponding rate and means for adding water to the saturated brine at another predetermined rate whereby the brine enters the cell at a predetermined concentration or density and at a rate which corresponds to the sum of said two rates.

Figure 6:
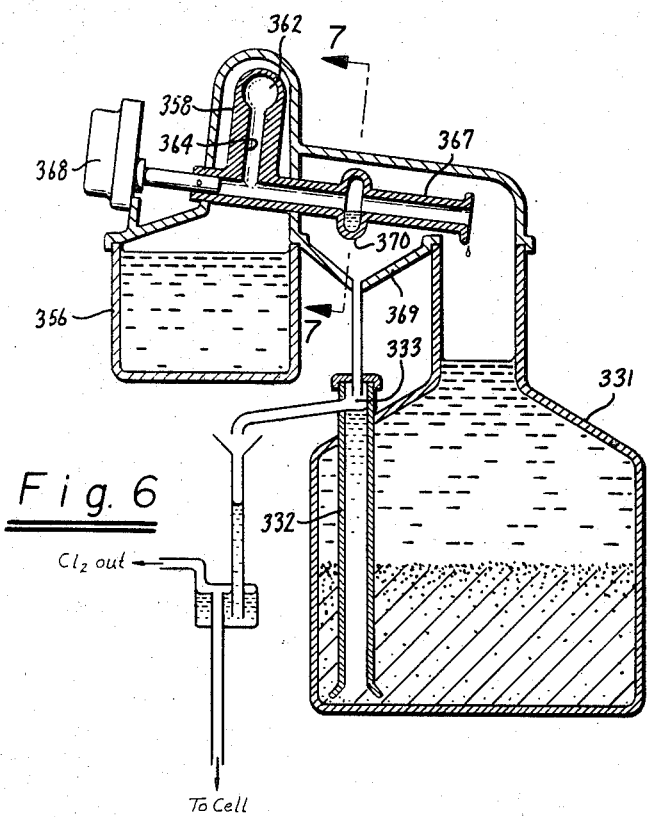
FIG. 6 is a cross sectional view of a brine metering arrangement.
Figure 7:
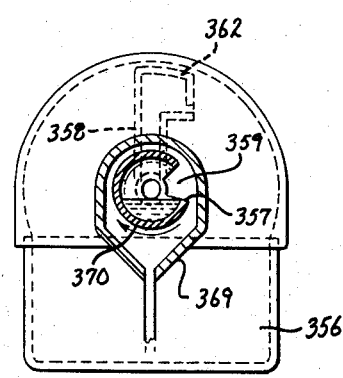
FIG. 7 is a sectional view taken along the line 7—7 of FIG. 6.

The arrangement of FIGS. 6 and 7 comprises a scoop 358 similar to the one of FIG. 2, for metering the flow of water from a water vessel 356 to mixing vessel 331. The scoop includes means for separating out a fraction of the volume of water, lifted by the scoop, and discharges this fraction of water so as to dilute the saturated brine leaving the mixing vessel 356 and flowing to the electrolytic cell. The scoop 358 is mounted on a hollow shaft 367, which is rotated by a slow speed motor 368. The shaft is tilted to allow water lifted by the scoop, to pass through passage 364 into the hollow shaft 367 and flow into the mixing vessel. The flow of water will occur at that moment the rotation of the arm 358 is such that the passage 364 is horizontal or somewhat above horizontal.

A short portion of the hollow shaft has an enlargement 370 forming a pocket which collects a small portion of the volume of liquid from the scoop. As shown in FIG. 7, the enlargement 370 is open at 359. The open part has such an angular position that water cannot escape through it when the scoop empties into the shaft and into the mixing vessel. However, later in the cycle of rotation of shaft 367 the liquid which has collected in the pocket will escape over the lip 357. The liquid there falls into the funnel 369 and is led to the top 333 of tube 332. The tube 332 extends from near the bottom of the mixing vessel and up to the desired level of an overflow, that takes the brine on to the input column of the electrolytic cell. The brine rising in tube 332 will be saturated as long as solid salt is covering the lower end of the tube 332. When this saturated brine is mixed with the water from the funnel 369, it is diluted to assume a concentration, determined by the ratio of effective volumes of the pocket 370 and the scoop. The apparatus just described thus has the double role of metering the rate of flow of brine to the cell and of providing the desired brine concentration.

Obviously the same function could be obtained by having two scoops, actuated by the same motive means, one taking water to the mixing vessel and the other one taking water to the point of dilution 333. The ratio of effective volumes of the two scoops would determine the concentration.

Figure 8:
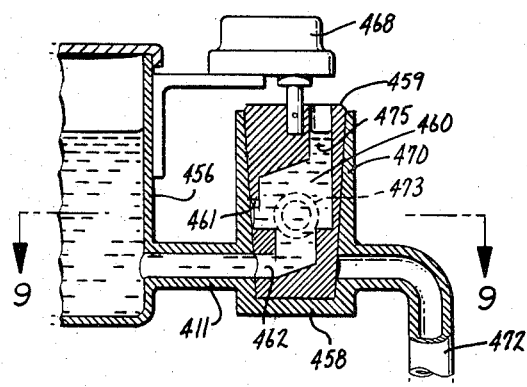
FIG. 8 is a cross sectional view of another brine metering arrangement.
Figure 9:
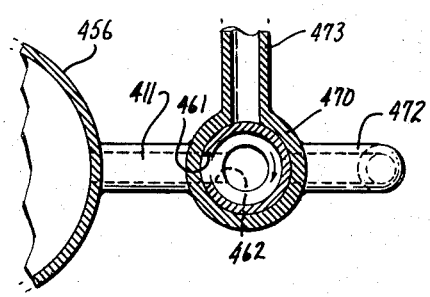
FIG. 9 is a sectional view taken along the line 9—9 of FIG. 8.

Another example of such metering is shown in FIGS. 8 and 9. The water vessel 456 is associated with metering device 458 which meters and distributes water in defined quantities of water received from the water vessel at 411 and delivers them to the mixing vessel at 473 and the point of dilution at 472. The device has the shape of a cock valve. The conical plug 459 is rotated in its housing 470 by the slow-speed motor 468. The plug has a hollow 460, wider in its upper part than in the lower one. The plug has two radial horizontal holes thorugh its wall, a lower hole 462, a higher hole 461.

The housing has three tube connections, two lower ones 411 and 472, connected to the water vessel and the point of dilution respectively, and one at the higher level leading to the mixing vessel. In the position of the plug shown in FIG. 8, the hollow opening 462 is filled up from the water vessel through tube 411 and hole 462. Even if the water level would vary somewhat, the volume of water in the plug is fairly well defined, as the hollow opening is vented through the narrow passage 475.

In FIG. 9 the plug is in a position where it has rotated 90° in the sense of the arrow from the positon shown in FIG. 8. The inlet 411 is now closed and the pole 461 in the plug is oriented with tube 473, so that the upper part of the hollow will empty into the mixing vessel. After another 90° rotation the hole 462 of the plug will be oriented with tube 472, discharging the remaining volume of water at the point of dilution. The degree of dilution will be determined by the ratio of volumes in the upper and lower parts of the hollow plug.

It should be noted that the other metering devices may be used for the same combined purpose of metering and of achieving a desired degree of concentration. One tube would carry water from the water vessel to the mixing vessel at a rate determined by the water head and the flow resistance of the tube, and another such tube would carry water, at a smaller rate of flow, to the point of dilution. It should further be noted that one of the two metering devices, namely the one with the higher rate of flow, could be located anywhere in the line of flow from water vessel to the input column of the cell. It could for instance be located at point 333 of FIG. 6, metering then either the ready diluted brine from this point, of the saturated brine drawn from the tube 332. The other metering device, providing water for dilution, will still take from the water vessel, but could discharge anywhere between tube 332 and the cell.

Some figures will serve to put my invention in the right quantitative perspective. A medium-sized swimming pool, containing about 20,000 gallons of water, would require an addition of 30 grams of chlorine per day as an average over the year in a moderately warm climate. According to Faraday's law, one ampere of current will free 1.3 grams of chlorine per hour in the electrolyzing process. Assuming an efficiency of 50 percent, a running time of 12 hours per day at 4 amperes will produce 31 grams of chlorine per day. With a voltage drop in the electrolyzer of about 5 volts, the consumption of electric power would be about 20 watts, corresponding to 88 kWh per year (4,400 operating hours per year).

With a utilization of about half the chlorine contents of rock salt, the consumption of salt would be about 75 kilograms (163 lbs.) per year. The cost of electric power and salt would, therefore, only be a very small fraciton of the annual cost of chlorine chemicals now generally used. Tests of several units constructed according to my invention have proven these approximate figures.

I claim:

1. A chlorinator adapted to be connected to deliver chlorine to water comprising an electrolytic cell for decomposing brine into small quantities of chlorine gas and other products, said cell having an anode and a cathode chamber separated by a diaphragm, an anode disposed in said anode chamber, a cathode disposed in said cathode chamber, means providing three columns above said cell, said first column communicating with said cathode chamber and having an overflow at its upper end which is vented to the atmosphere and forms an output for discharging the liquid products formed in said cell, the vertical distance between the electrochemically active parts of said cell and said overflow being greater in terms of liquid column pressure than the maximum back pressure to be encountered at the point of delivery of chlorine gas into the water, said second and third columns communicating with said anode chamber and having their top ends at a higher level than said overflow, said second column connected to the point of delivery of chlorine gas into the water, said third column being vented to the atmosphere and forming a brine input to the cell, a power source for supplying electricity to drive said cell, a source of brine for said cell including mixing vessel means for receiving solid salt crystals in a quantity sufficient for extended operation and means for providing a supply of water to said vessel to form an aqueous salt solution in contact with said solid salt crystals, means for receiving the output of said mixing vessel and for forwarding brine of a predetermined concentration to said electrolytic cell and metering means in the line of flow between said supply of water and said brine input to the cell for causing small rate of flow of brine to said cell.

2. A chlorinator as in claim 1 further including means to limit the rate of supply of water to said mixing vessel responsive to a liquid level such that said liquid level is kept roughly constant.

3. A chlorinator as in claim 2, said limiting means consisting of a float valve.

4. A chlorinator as in claim 3 wherein the float valve is arranged to discharge into the mixing vessel and to keep constant the liquid level in said mixing vessel.

5. A chlorinator as in claim 2 wherein a separate water vessel is arranged in the path from the water supply to the mixing vessel, said means responsive to a liquid level being located in said water vessel to supply fresh water to this vessel at constant water level.

6. A chlorinator as in claim 5 wherein the metering means are connected between said water vessel and the mixing vessel supplied from it.

7. A chlorinator as in claim 5 wherein the water vessel is connected to discharge into the mixing vessel through such a passage having a restriction so that salt water cannot penetrate back to the water vessel in appreciable quantities, said metering means being connected between the mixing vessel and the brine input of the electrolytic cell.

8. A combination of a chorinator as in claim 5 and a circulating water system including a pump to circulate water from and back to the volume of water to be chorinated, a by-pass line being connected to the output side of said pump to divert water to said vessel, a spillway to maintain constant water level and a return line to carry the water from the spillway back to said volume of water.

9. A combination as in claim 8 wherein the chlorine output from the electrolytic cell is connected to discharge into said return line.

10. A chlorinator as in claim 1 wherein means for receiving the output of said mixing vessel and forwarding brine of a predetermined concentration to said electrolytic cell comprises a separate brine vessel in addition to the mixing vessel, means connecting said brine vessel to receive brine from the mixing vessel and to deliver it to the brine input of the electrolytic cell via said metering means, and means responsive to the liquid level in said brine vessel for controlling the water supplied to said mixing vessel.

11. A chlorinator as in claim 1 wherein said metering means consists of a scoop, means for moving said scoop on a path intersecting a constant liquid level so that liquid is perodically scooped therefrom and conveyed towards the electrolytic cell.

12. A chorinator as in claim 1 in which said metering means comprises a vented receptacle having an input and output, a container adapted to have a substantially constant free liquid level at the input side of said receptacle, and means causing said receptacle to alternately communicate its input side with said container and its output with the electrolytic cell so that said receptacle periodically and at a predetermined frequency can receive liquid from said container and deliver it by gravity towards the electrolytic cell.

13. A chlorinator as in claim 12 wherein said receptacle consists of a scoop, means for moving said scoop on a path intersecting said constant liquid level so that the liquid is periodically scooped therefrom and conveyed towards said electrolytic cell.

14. A chlorinator as in claim 1, wherein said means for forwarding brine of a predetermined concentration includes additional metering means inserted between said supply of water and said electrolytic cell so as to add water at a predetermined rate to said metered output of the mixing vessel and so that the total flow of brine to the cell is defined by the combined flow through the two metering means.

15. A chlorinator as in claim 14 where said two metering means include mechanically movable receptacles having a common prime mover.

16. A chlorinator adapted to be connected to a volume of water such as a swimming pool comprising an electrolytic cell for decomposing brine into small quantities of chlorine gas and other products, said cell having an anode and a cathode chamber separated by a diaphragm, an anode disposed in said anode chamber, a cathode disposed in said cathode chamber, first and second liquid columns above said cell and communicating with its anode chamber, one of said columns forming a first output for discharging free chlorine gas into said volume of water under varying back pressure and the other one forming a brine input to the cell and extending to a height sufficient when filled with brine to balance the maximum value of said gas pressure, a third liquid column above said cell communicating with its cathode chamber and forming an output for discharging the liquid products formed in said cell, a power supply for supplying electricity to drive said cell, a source of brine including means forming a mixing vessel for receiving solid salt crystals and for maintaining a supply of water in contact with said solid salt crystals to form an aqueous salt solution having a salt density gradient, means for conveying salt solution of preselected density to the input column of said electrolytic cell, means submerged in the salt solution of the mixing vessel and responsive to the density variations thereof for conveying salt solution of preselected density from the mixing vessel for use in said electrolytic cell, and metering means for causing small rates of flow of brine to said cell.

17. A chlorinator as in claim 16 wherein said means for conveying salt solution of a preselected density includes a flexible conduit and a float connected to the end of said conduit, said float having a ratio of weight to displacement ratio equal to said preselected value of density.

18. A chlorinator as in claim 17 wherein said float has a weight to displacement ratio corresponding to that of a salt solution containing from about 10 to 24 grams sodium chloride per 100 grams of solution.

19. A chlorinator adapted to be connected to a pool of water such as a swimming pool comprising an electrolytic cell for decomposing brine into chlorine gas and other products, said cell including means forming an input for receiving brine and means forming a first output for discharging free chlorine gas to said pool of water and another output for discharging the other products formed in said cell, a power supply for supplying electricity to drive said cell, a source of brine including means forming a mixing vessel for receiving solid salt crystals and for maintaining a supply of water in contact with said solid salt crystals to form an aqueous salt solution having a salt density gradient, means submerged in said salt solution and responsive to the density variations thereof for conveying salt solution of predetermined density to the input of said electrolytic cell, metering means for causing small quantities of brine to be slowly delivered to said cell, said metering means having a full flow section to minimize clogging.

20. A chlorinator adapted to be connected to a volume of water comprising an electrolytic cell for decomposing unsaturated brine of preselected density into small quantities of chlorine gas and other products, said cell having an anode and a cathode chamber separated by a diaphragm, an anode disposed in said anode chamber, a cathode disposed in said cathode chamber, means providing first and second liquid columns above said cell and communicating with its anode chamber, the first column forming a first output for discharging free chlorine gas into said volume of water against varying back pressure and the second one forming a brine intput to the cell and extending to a height sufficient when filled with brine to balanace the maximum value of said back pressure, said height being greater than the largest vertical distance between electrolytically active parts of said anode and cathode, means providing a third liquid column above said cell communicating with its cathode chamber and forming an output for discharging the liquid products formed in said cell, a power source for supplying electricity to drive said cell, a source of brine connected to said brine input to the cell, consisting of means forming a mixing vessel for receiving solid salt crystals in a quantity sufficient for more than one month of operation, means for maintaining a supply of water from a separate water vessel to said mixing vessel to form an aqueous salt solution in contact with said solid salt crystals, and to cause brine to flow from the mixing vessel to the cell, means for maintaining a roughly constant water level in said water vessel, and metering means responsive to this liquid level for causing a small rate of flow of said supply of water to the mixing vessel.

21. A chlorinator adapted to be connected to deliver chlorine to water comprising an electrolytic cell for decomposing unsaturated brine into small quantities of chlorine gas and other products, said cell having an anode and a cathode chamber separated by a diaphragm, an anode disposed in said anode chamber, a cathode disposed in said cathode chamber, means providing three columns above said cell, said first column communicating with said cathode chamber and having an overflow at its upper end which is vented to the atmosphere and forms an output for discharging the liquid products formed in said cell, the vertical distance between the electrochemically active parts of said cell and said overflow being greater in terms of liquid column pressure than the maximum back pressure to be encountered at the point of delivery of chlorine gas into the water, said second and third columns communicating with said anode chamber and having their top ends at a higher level than said overflow, said second column connected to the point of delivery of chlorine gas into the water, said third column being vented to the atmosphere and forming a brine input to the cell, a power source for supplying electricity to drive said cell, a source of brine for said cell including mixing vessel means for receiving solid salt crystals in a quantity sufficient for extended operation and means for providing a supply of water to said vessel to form an aqueous salt solution in contact with said solid salt crystals, a conduit leading from the bottom of said vessel to said input of the cell to receive saturated brine from said vessel and forward it towards the cell, first metering means responsive to a substantially constant liquid level inserted in the line of flow from said supply of water to said input of the cell for causing a predetermined small rate of flow of saturated brine towards the cell, second metering means inserted between said supply of water and said cell for causing predetermined small rate of flow of water to be added to said flow of saturated brine to dilute it, the components of said chlorinator being at such levels relative to each other that the flow of liquid from said supply of water to said output is substantially independent of water pressure.

22. A chlorinator as in claim 21 wherein the input to both said metering means is a water vessel arranged to be fed from said water supply in such a way that its water level is kept substantially constant.

* * * * *